United States Patent
Johs et al.

(10) Patent No.: US 7,907,280 B2
(45) Date of Patent: *Mar. 15, 2011

(54) METHOD OF CONSTRUCTING A DEVIATION ANGLE SELF COMPENSATING SUBSTANTIALLY ACHROMATIC RETARDER TO COMPENSATE BEAM TRASLATION

(75) Inventors: Blaine D. Johs, Lincoln, NE (US); Steven E. Green, Lincoln, NE (US); Craig M. Herzinger, Lincoln, NE (US); Duane E. Meyer, Lincoln, NE (US); Martin M. Liphardt, Lincoln, NE (US)

(73) Assignee: J.A. Woollam Co., Inc., Lincoln, NE (US)

( * ) Notice: Subject to any disclaimer, the term of this patent is extended or adjusted under 35 U.S.C. 154(b) by 309 days.

This patent is subject to a terminal disclaimer.

(21) Appl. No.: 12/290,787

(22) Filed: Nov. 4, 2008

(65) Prior Publication Data

US 2009/0091758 A1   Apr. 9, 2009

Related U.S. Application Data

(63) Continuation-in-part of application No. 11/633,138, filed on Dec. 4, 2006, now Pat. No. 7,450,231, and a continuation-in-part of application No. 11/590,408, filed on Oct. 31, 2006, now Pat. No. 7,460,230.

(60) Provisional application No. 60/733,910, filed on Nov. 4, 2005.

(51) Int. Cl.
*G01J 4/00* (2006.01)
*G02B 5/30* (2006.01)

(52) U.S. Cl. .................. 356/365; 356/369; 359/494
(58) Field of Classification Search .......... 356/364–369; 359/494, 496
See application file for complete search history.

(56) References Cited

U.S. PATENT DOCUMENTS

| | | | |
|---|---|---|---|
| 7,233,396 B1 * | 6/2007 | Hall et al. | 356/369 |
| 7,298,480 B2 * | 11/2007 | Garcia-Caurel et al. | 356/364 |
| 7,450,231 B2 * | 11/2008 | Johs et al. | 356/365 |
| 7,460,230 B2 * | 12/2008 | Johs et al. | 356/365 |

* cited by examiner

*Primary Examiner* — L. G. Lauchman
(74) *Attorney, Agent, or Firm* — James D. Welch

(57) ABSTRACT

A method of configuring a system for introducing a relative phase retardation into orthogonally polarized components of an electromagnetic beam entered thereinto, wherein the system involves a substantially achromatic multiple element retarder system for use in wide spectral range (for example, 190-1700 nm) rotating compensator spectroscopic ellipsometer and/or polarimeter systems.

28 Claims, 10 Drawing Sheets

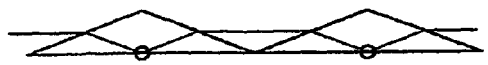
FIG. 9a
FIG. 10a
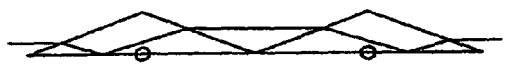
FIG. 9b
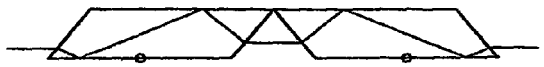
FIG. 10b
Beam angle=+1°, Ψ=56.953°, Δ=70.425°
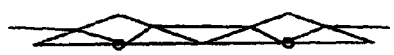
FIG. 11a
Beam angle=0°, Ψ=56.940°, Δ=70.419°
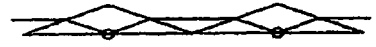
FIG. 11b
Beam angle=−1°, Ψ=56.953°, Δ=70.425°
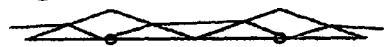
FIG. 11c
Beam angle=+1°, Ψ=52.357°, Δ=114.232°
FIG. 11d
Beam angle=0°, Ψ=52.349°, Δ=114.221°
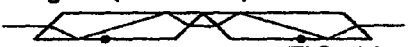
FIG. 11e
Beam angle=−1°, Ψ=52.357°, Δ=114.232°
FIG. 11f
FIG. 11
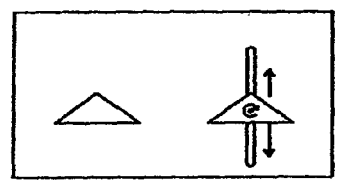
FIG. 12a
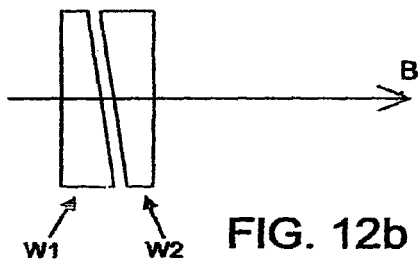
FIG. 12b

METHOD OF CONSTRUCTING A DEVIATION ANGLE SELF COMPENSATING SUBSTANTIALLY ACHROMATIC RETARDER TO COMPENSATE BEAM TRASLATION

This Application is a CIP of application Ser. No. 11/633,138 Filed Dec. 4, 2006 now U.S. Pat. No. 7,450,231, and of Ser. No. 11/590,408 Filed Oct. 31, 2006 now U.S. Pat. No. 7,460,230, and therevia Claims Benefit of Provisional Application Ser. No. 60/733,910 Filed Nov. 4, 2005.

TECHNICAL FIELD

The present invention relates to retarders for entering retardance between orthogonal components of a beam of polarized electromagnetic radiation, and more particularly is a method of configuring a system for introducing a relative phase retardation into orthogonally polarized components of an electromagnetic beam entered thereinto, wherein the system involves a substantially achromatic multiple element retarder system for use in wide spectral range (for example, 190-1700 nm) rotating compensator spectroscopic ellipsometer and/or polarimeter systems.

BACKGROUND

To obtain acceptable ellipsometer and/or polarimeter performance over a wide spectral range, compensator-based ellipsometer and/or polarimeter designs require a compensator element that provides retardance within a certain acceptable range over the entire spectral range. Traditionally, birefringent waveplates of quartz or $MgF_2$ have been used as compensator elements in rotating element designs. A single waveplate exhibits a (1/wavelength) dependence in retardance vs. wavelength, while a dual/multiple waveplate design, (as disclosed in U.S. Pat. No. 6,353,477), can minimize the effect of the (1/wavelength) dependence.

With the present invention in mind, known relevant patents are:
U.S. Pat. No. 5,706,212 to Thompson et al.;
U.S. Pat. No. 6,353,477 to Johs et al.;
U.S. Pat. No. 5,963,325 to Johs et al.;
U.S. Pat. No. 6,141,102 to Johs et al.;
U.S. Pat. No. 6,084,675 to Herzinger et al.; U.S. Pat. No. 6,118,537 to Johs et al.;
U.S. Pat. No. 6,100,981 to Johs et al.;
U.S. Pat. No. 6,084,674 to Johs et al.

An application which published Jun. 28, 2007 was recently identified and is US 2007/0146706 A1.

Need remains for additional retarder systems which provide improved characteristics.

DISCLOSURE OF THE INVENTION

First, as disclosed in Parent Applications, it is noted that the present invention can be applied in an ellipsometer or polarimeter system comprising:
a) a source of electromagnetic radiation;
b) a polarizer;
c) a stage for supporting a sample;
d) an analyzer; and
e) a detector;
said ellipsometer or polarimeter system further comprising at least one rotating or rotatable compensator system present at least one location selected from the group consisting of: between said source of electromagnetic radiation and said stage for supporting a sample; and
between said stage for supporting a sample and said detector.

The at least one rotating or rotatable compensator comprises at least two sequential elements oriented with respect to one another such that said entered electromagnetic beam undergoes internal reflection at least once in each of the elements, with the sequence, orientation, geometry, and symmetry of the elements being such that the locus of the output beam is substantially angularly undeviated from that of the input beam by a translation of the system, and the locus of the exiting output beam angle is substantially undeviated from that of the input beam by a rotation of the system.

The present invention is a system for introducing a relative phase retardation between orthogonal components of a polarized electromagnetic beam. Said system consists of at least two sequential elements, and said beam undergoes internal reflection at least once in each of said elements. Importantly, the sequence, orientation, geometry, and symmetry of the elements in the system is such that the locus of an exiting output beam is substantially angularly undeviated from that of the input beam by a translation of the system, and the exiting output beam angle is substantially angularly undeviated from that of the input beam by a rotation of the system.

One embodiment provides that two triangular shaped prisms comprise the elements. Preferred, non-limiting, design provides that the angles of said triangular prisms are 26, 128, and 26, and fabrication of the prisms can be, but is not necessarily, from fused silica.

Another embodiment provides that two parallelogram shaped rhombs are used for the elements. Preferred, non-limiting, design provides that angles of the parallelogram shaped rhombs are 36, 144, 36, and 144 degrees or 45, 135, 45 and 135 degrees, and again, fabrication of the parallelogram can be, but is not necessarily, from fused silica.

Another embodiment provides that four right angle prisms are used for elements. Preferred, non-limiting, design provides that angles are 45, 90 and 45, and again, fabrication of the prism can be, but is not necessarily, from fused silica.

Further, at least one of the elements can comprise a mechanism for translating and/or tilting at least one of the elements with respect to another element, for the purpose of aligning the elements of the system so as to reduce deviation between the locus of an output beam and that of a beam input to said system.

The present invention can be better described as being a system for introducing a relative phase retardation into orthogonally polarized components of an electromagnetic beam entered thereinto, said system consisting of at least two sequential elements oriented with respect to one another such that said entered electromagnetic beam undergoes internal reflection at least once in each of the at least two elements; the sequence, orientation, geometry, and symmetry of the elements being such that the output beam position is substantially undeviated by a translation of the system, and the output beam angle is substantially undeviated by a rotation of the system.

The elements can be similar triangular shaped prisms each having:
first and second sides of equal length which project from one another at an angle greater than ninety degrees therebetween, and
a third side oriented opposite said greater than ninety degree angle,
said at least two similar triangular shaped prisms being oriented with respect to one another such that the third sides thereof are substantially colinear;

such that a beam of electromagnetic radiation caused to enter the first side of the first thereof, at a non-normal angle thereto, is refracted so that it internally reflects from said third side thereof, then exits said second side thereof in a direction such that it then enters the first side of another thereof at a non-normal angle thereto, is refracted so that it internally reflects from said third side thereof, then exits said second side thereof. The angles of the triangular prism can be 26, 128, and 26 degrees and the prisms can be fabricated from fused silica.

The elements can be parallelogram shaped rhombs, each said rhomb having first, second, third and forth sides, said first and third sides being substantially parallel to one another and said second and forth sides being substantially parallel to one another, said first and second, and said third and forth sides of the first parallelogram shaped rhomb meeting one another at angles greater than ninety degrees therebetween, and said second and third sides and said first and forth sides thereof meeting one another at angles less than ninety degrees therebetween with the second parallelogram shaped rhomb being positioned as a mirror image thereto, said at least two parallelogram shaped rhombs being oriented with their second sides being substantially colinear and with their forth sides thereof being substantially colinear;

such that a beam of electromagnetic radiation caused to enter the first side of the first thereof, at a non-normal angle thereto, is refracted so that it internally reflects from said forth and second sides thereof, then exits said third side thereof in a direction such that it then enters the first side of the second thereof at a non-normal angle thereto, is refracted so that it internally reflects from said second and forth side thereof, then exits said third side thereof. The angles of the parallelogram shaped rhomb can be 36, 144, 36, and 144 degrees or 45, 135, 45 and 135 degrees, and can be fabricated from fused silica.

The elements can be rhombs, each said rhomb having first, second, third and forth sides, said first and third sides being substantially parallel to one another and said second and forth sides being substantially parallel to one another, said first and second, and said third and forth sides of the first rhomb meeting one another at angles greater than ninety degrees therebetween, and said second and third sides and said first and forth sides of the first rhomb meeting one another at angles less than ninety degrees therebetween, with the second rhomb appearing as a mirror image;

said at least two parallelogram shaped rhombs being oriented with their first and third sides being substantially parallel to one another;

such that a beam of electromagnetic radiation caused to enter the first side of the first thereof, at substantially a normal angle thereto, then proceeds so that it internally reflects from said forth and second side thereof, then exits said third side thereof in a direction such that it then enters the first side of another thereof at a substantial normal angle thereto, then proceeds so that it internally reflects from said second and forth side thereof, then exits said third side thereof;

said system being characterized in that at least one of the sides of at least one of the parallelogram shaped rhombs has a coating thereupon which has a different, (eg. lower), refractive index than does the material from which said corresponding parallelogram shaped rhomb is comprised. The angles of the parallelogram shaped rhomb can be 36, 144, 36, and 144 degrees or 45, 135, 45 and 135 degrees, and the rhombs can be fabricated from fused silica, with the coating being $MgF_2$.

The elements can be at least four sequential elements, said beam undergoing internal reflection once in each of the elements, said system being characterized in that each of said at least four elements are right angle prisms having right angle sides adjacent to the right angle thereof and a side opposite the right angle thereof; said right angle prisms being oriented with respect to one another such that, as viewed in side elevation, the first right angle prism is positioned so that its side opposite the right angle thereof is facing downward and to the right, and so that directly above the first right angle prism is present the second right angle prism, which is oriented so that its side opposite the right angle thereof is facing upward and to the left, and so that directly to the right of the second right angle prism is the third right angle prism, which is oriented so that its side opposite the right angle thereof is facing upward and to the right, and so that directly below the third right angle prism is positioned the forth right angle prism, oriented so that its side opposite the right angle thereof is facing downward and to the left. The angles of the right angle prisms can be 45, 90 and 45 degrees and the right angle prisms can be fabricated from fused silica.

As recited above, any of the foregoing embodiments can be further characterized by at least one selection from:
  at least one of the sequential elements has a mechanism for translating and/or tilting the element, for the purpose of aligning the system such that the output beam is substantially undeviated from said input beam;
  at least one of the sequential elements has a coating upon a surface thereof at which internal reflection of a beam of electromagnetic radiation occurs, said coating having a different refractive index than does the material from which said corresponding element is comprised;
  at least one of the sequential elements has a coating upon a surface thereof through which a beam of electromagnetic radiation enters or exist, said coating having a different refractive index than does the material from which said corresponding element is comprised;
  there is present an additional sequential multiple wedge system in said system for introducing a relative phase retardation into orthogonally polarized components of an electromagnetic beam, wherein one said wedge can be rotated with respect to another said wedge and/or both wedges can be rotated simultaneously, for the purpose of aligning the system such that the output beam is substantially undeviated from said input beam.

A present invention method involves providing a compensator system comprising at least two elements oriented with respect to one another such that an entered electromagnetic beam undergoes internal reflection at least once in each of the elements, with the sequence, orientation, geometry, and symmetry of the elements being such that the locus of output beam from said system is substantially undeviated from that of the input beam by a translation of the system, and the locus of the output beam angle is substantially undeviated from that of the input beam by a rotation of the system;

said method comprising the steps of:
  a) providing a system for introducing a relative phase retardation into orthogonally polarized components of an electromagnetic beam, said system comprising of at least two sequential elements, said beam undergoing internal reflection at least once in each of the elements;
  b) causing a beam of electromagnetic radiation to enter said system via a first of said at least two sequential elements and pass through said at least two sequential elements while undergoing at least one internal reflection in each;

such that the exiting beam has retardation entered thereinto via said internal reflections, and such that the locus of the exiting beam is substantially undeviated from that of the entering beam.

A coating can be provided on at least one surface of at least one of element, said coating having a refractive index less than or greater than that of the material from which said element is comprised.

Said method can further comprise providing an additional sequential multiple wedge system in said system, wherein one said wedge can be rotated with respect to another thereof and/or both wedges can be rotated simultaneously, for the purpose of aligning the system such that the output beam from said forth right angle prism is substantially undeviated from the beam input to said first right angle prism.

Continuing, the foregoing is particularly applicable to retarder systems wherein the at least two elements which are oriented with respect to one another are identical. It does happan, however, that in practice two parallelogram shaped elements will not be identical. When such non-identical elements are paired to form a retarder system, the result can be that angular deviation and/or lateral offset of a beam of electromagnetic radiation entered thereinto results by passage therethrough. To minimize such adverse effects it is disclosed that it is good practice to first pair up only well matched parallelogram shaped elements. In addition, when a system of two well matched parallelograms is constructed, it can still happan that a beam entered thereto will introduce a lateral offset into an exiting beam. Alignment practice can then involve rotating, as a whole, the system of two well matched parallelogram shaped elements which are fixed with respect to one another, so that the input beam enters at an angle offset from a normal to the side of the first parallelogram into which the beam of electromagnetic radiation is entered. This practiced can serve to overcome beam lateral translation.

The present invention is then a method of constructing a multiple element retarder system for introducing a relative phase retardation between orthogonal components of a polarized beam of electromagnetic radiation entered thereinto. Said multiple element retarder system comprises at least two similar elements which are sequentially secured with respect to one another such that a beam of electromagnetic radiation entered to the first thereof undergoes internal reflection at least once in each of the at least two elements, and exits the second thereof along a locus which is not angularly deviated or laterally offset from that of said entered beam by more than acceptable amounts.

Said method comprises the steps of:
practicing steps a and b in either order, said steps a and b being:
 a) providing a multiplicity of similar elements;
 b) defining acceptable beam angular deviation and lateral offset values.
Said method further comprises:
 c) from said multiplicity of similar elements selecting two thereof and securing them in a sequential system, then experimentally monitoring angular deviation entered to a beam of electromagnetic radiation entered to a first thereof, so that it undergoes internal reflection at least once in each of the at least two elements, and then exits the second thereof;
 d) determining if the beam angular deviation experimentally monitored in step c is acceptable under the criteria defined in step b, and performing a selection from the group consisting of:
  accepting the said sequential system if said defined angular deviation criteria is met and proceeding to step e; and
  rejecting said sequential system and repeating step c if said defined angular deviation criteria is not met.
Said method continues with:
 e) if practice of step d results in accepting said sequential system, proceeding to determine if a lateral offset exists between the beam entered to the first element and that exiting the second element, and if so performing at least one selection from the group consisting of:
  changing the relative orientation of said selected elements with respect to one another; and
  rotating said system of the two selected elements as said unit about an axis not parallel to the electromagnetic beam;
until said lateral offset entered to said beam of electromagnetic radiation is determined to be acceptable under the criteria defined in step b.
Said method can further include:
 f) optionally experimentally re-checking if the angular deviation entered to said beam of electromagnetic radiation is still acceptable after practice of step e; and
accepting said sequential system only if both the angular deviation and lateral offset entered to said beam of electromagnetic radiation are then acceptable under the criteria of step b.

Step c can comprise determining a plurality of acceptable sequential combinations of selected elements via a systematic testing of at least some of all possible sequential combinations of selected elements, followed by separate practice of steps d-f for at least two of said sequential combinations.

Step c can also involve selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, Step a can involve providing two parallelogram shaped rhombs oriented with their first and third sides being substantially parallel to one another, wherein "substantially parallel to one another" means that said said third (RS3) side of said first first (RS1) and first (RS1) side of the second of said parallelogram shaped rhombs are offset from being parallel to one another by no more than about +/−ten (10) degrees;
such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

Step c can involve selecting two sequential parallelogram shaped rhombs wherein the angles of the parallelogram shaped rhomb are nominally selected from the group consisting of:

36, 144, 36, and 144 degrees; and
45, 135, 45 and 135 degrees.

Step c can involve selecting two sequential parallelogram shaped rhombs which are fabricated from fused silica.

Where two sequential parallelogram shaped rhombs are involved they can be characterized by at least one of the second RS2 and forth RS4 sides of at least one of the parallelogram shaped rhombs having a coating thereupon which has a different refractive index than does the material from which said corresponding parallelogram shaped rhomb is comprised.

Step a can involve providing a multiplicity of parallelogram shaped rhombs as elements and step b involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are parallel to one another within about +/−ten (10) degrees. In use a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof;

said system being characterized in that at least one of the second RS2 and forth RS4 sides of at least one of the parallelogram shaped rhombs has a coating thereupon which has a different refractive index than does the material from which said corresponding parallelogram shaped rhomb is comprised.

Said method can involve providing two sequential parallelogram shaped rhombs wherein the angles of the parallelogram shaped rhomb are nominally selected from the group consisting of:
36, 144, 36, and 144 degrees; and
45, 135, 45 and 135 degrees.

Said method can involve providing sequential parallelogram shaped rhombs which are fabricated from fused silica and the coating is $MgF_2$.

Step b can involve selecting a system of sequential elements which are further characterized by at least one selection made from the group consisting of:
at least one of the sequential elements is mounted to a mechanism for translating and/or tilting the element, for the purpose of aligning the system such that the output beam is substantially angularly undeviated from said input beam;
at least one of the sequential elements has a coating upon a surface thereof at which internal reflection of a beam of electromagnetic radiation occurs, said coating having a different refractive index than does the material from which said corresponding element is comprised;
at least one of the sequential elements has a coating upon a surface thereof through which a beam of electromagnetic radiation enters or exist, said coating having a different refractive index than does the material from which said corresponding element is comprised;
there is present an additional sequential multiple wedge system in said system for introducing a relative phase retardation into orthogonally polarized components of an electromagnetic beam, wherein one said wedge W1 can be rotated with respect to another W2 thereof and/or both wedges W1 W2 can be rotated simultaneously, for the purpose of aligning the system such that the output beam is substantially angularly undeviated from said input beam.

A more detailed method of constructing a multiple element retarder system for introducing a relative phase retardation between orthogonal components of a polarized beam of electromagnetic radiation entered thereinto, said multiple element retarder system comprising at least two similar elements which are sequentially secured with respect to one another such that a beam of electromagnetic radiation entered to the first thereof undergoes internal reflection at least once in each of the at least two elements, and exits the second thereof along a locus which is not angularly deviated or laterally offset from that of said entered beam by more than acceptable amounts; comprises, before practice of step d, the steps of:
a) providing a multiplicity of similar elements;
b) experimentally determining and recording data describing measured angular deviation entered to a beam of electromagnetic radiation by interaction with each of said multiplicity of similar elements individually;
c) defining acceptable beam angular deviation and laterally offset values and providing a computer program which is capable of analyzing said data recorded in step b.

Said method further comprises the steps of:
d) applying said computer program provided in step c to data recorded in step b the end that pairings of similar elements are identified which in sequence meet the acceptable beam angular deviation values identified in step c;
e) selecting at least one of said pairings of similar elements identified in step d and securing the paired similar elements in a sequential system, then experimentally monitoring angular deviation entered to a beam of electromagnetic radiation entered to a first thereof, so that it undergoes internal reflection at least once in each of the at least two elements, and then exits the second thereof;
f) determining if the beam angular deviation experimentally monitored in step e is acceptable under the criteria defined in step c, and performing a selection from the group consisting of:
accepting the said sequential system if said defined angular deviation criteria is met and proceeding to step g; and
rejecting said sequential system and repeating step e with another selected pairing of similar elements if said defined angular deviation criteria is not met;
g) if practice of step f results in accepting said sequential system, proceeding to determine if a laterally offset exists between the beam entered to the first element and that exiting the second element, and if so performing at least one selection from the group consisting of:
changing the relative orientation of said selected elements with respect to one another; and rotating said system of the two selected elements as said unit about an axis not parallel to the beam of electromagnetic radiation;
until said lateral offset entered to said beam of electromagnetic radiation is determined to be acceptable under the criteria defined in step c.

Said method can optionally comprise:
h) optionally experimentally re-checking if the angular deviation entered to said beam of electromagnetic radiation is still acceptable after practice of step g.

Practice of said method enables the ability to accept said sequential system only if both the angular deviation and lateral offset entered to said beam of electromagnetic radiation are then acceptable under the criteria of step c.

Said method can involve the elements being paired by said computer program in step d, because neither of them was experimentally determined to enter significant angular deviation to a beam of electromagnetic radiation in step b, or the elements being paired by said computer program in step d because each of them was experimentally determined to enter angular deviation to a beam of electromagnetic radiation in step b, but in an offsetting manner.

Said method can involve said multiplicity of similar elements each provide at least two sides, either of which can be oriented to serve as the side into which a beam of electromagnetic radiation is input, and in which the step b practice of experimentally determining and recording data describing measured angular deviation entered to a beam of electromagnetic radiation by each of said multiplicity of similar elements individually is performed for each such orientation, and in which all recorded data is considered in step e.

Said method can further comprise determining, and placing in order, the relatively best pairings of similar elements by a method selected from the group consisting of:
using results from applying said computer program in step d to data recorded in step b to identify pairings of similar elements which in sequence provide the least beam angular deviation; and
recording experimental data determined in step e and applying said data to identify pairings of similar elements which in sequence provide the least beam angular deviation;

Said method can optionally further comprise defining a cut-off criteria point as regards beam angular deviation, and rejecting pairings which do not meet said cut-off criteria.

Said method step a can involve providing parallelogram shaped rhombs and step e involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween,
said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are offset from being parallel to one another by no more than about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

Said method step c can involve selecting two sequential parallelogram shaped rhombs wherein the angles of the parallelogram shaped rhomb are nominally selected from the group consisting of:
36, 144, 36, and 144 degrees; and
45, 135, 45 and 135 degrees.

Said method can involve, in step c, selecting two sequential parallelogram shaped rhombs which are fabricated from fused silica.

Said method can involve selecting two sequential parallelogram shaped rhombs which are characterized by at least one of the second RS2 and forth RS4 sides of at least one of the parallelogram shaped rhombs having a coating thereupon which has a different refractive index than does the material from which said corresponding parallelogram shaped rhomb is comprised.

Said method step a can involve providing a multiplicity of parallelogram shaped rhombs as elements and step e involve selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween,
said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are offset from being parallel to one another by no more than about +/−ten (10) degrees;
such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof;
said system being characterized in that at least one of the second RS2 and forth RS4 sides of at least one of the parallelogram shaped rhombs has a coating thereupon which has a different refractive index than does the material from which said corresponding parallelogram shaped rhomb is comprised.

Said method step a can involve providing two sequential parallelogram shaped rhombs wherein the angles of the parallelogram shaped rhomb are nominally selected from the group consisting of:

36, 144, 36, and 144 degrees; and
45, 135, 45 and 135 degrees.

Said method step a can involve providing sequential parallelogram shaped rhombs which are fabricated from fused silica and the coating is $MgF_2$.

Said method step e can involve selecting a system of sequential elements which are further characterized by at least one selection made from the group consisting of:
- at least one of the sequential elements is mounted to a mechanism for translating and/or tilting the element, for the purpose of aligning the system such that the exiting beam is substantially angularly undeviated from said input beam;
- at least one of the sequential elements has a coating upon a surface thereof at which internal reflection of a beam of electromagnetic radiation occurs, said coating having a different refractive index than does the material from which said corresponding element is comprised;
- at least one of the sequential elements has a coating upon a surface thereof through which a beam of electromagnetic radiation enters or exist, said coating having a different refractive index than does the material from which said corresponding element is comprised;
- there is present an additional sequential multiple wedge system in said system for introducing a relative phase retardation into orthogonally polarized components of an electromagnetic beam, wherein one said wedge W1 can be rotated with respect to another W2 thereof and/or both wedges W1 W2 can be rotated simultaneously, for the purpose of aligning the system such that the output beam is substantially angularly undeviated from said input beam.

Any of the foregoing methods can involve performing at least one selection from the group consisting of:
- storing at least some data in machine readable media;
- analyzing at least some of the data and storing at least some of the results of said analysis in machine readable media;
- displaying at least some data by electronic and/or non-electronic means;
- analyzing at least some of the data and displaying at least some of the results of said analysis by electronic and/or non-electronic means;
- causing at least some data to produce a signal which is applied to provide a concrete and tangible result;
- analyzing at least some of the data and causing at least some thereof to produce a signal which is applied to provide a concrete and tangible result.

Continuing, the present invention is further an ellipsometer or polarimeter system comprising:
a) a source of electromagnetic radiation;
b) a polarizer;
c) a stage for supporting a sample;
d) an analyzer; and
e) a detector;
wherein said ellipsometer or polarimeter system further comprises at least one rotating or rotatable compensator system present at at least one location selected from the group consisting of:
between said source of electromagnetic radiation and said stage for supporting a sample; and
between said stage for supporting a sample and said detector.

The at least one rotating or rotatable compensator comprises at least two sequential elements oriented with respect to one another such that said entered electromagnetic beam undergoes internal reflection at least once in each of the elements, with the sequence, orientation, geometry, and symmetry of the elements being such that the locus of the output beam is substantially angularly undeviated from that of the input beam by a translation of the system, and the locus of the output beam angle is substantially undeviated from that of the input beam by a rotation of the system.

In particular, said at least one rotating or rotatable compensator can comprise two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second. RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another", means that said said third (RS3) side of said first and first (RS1) side of the second of said parallelogram shaped rhombs are parallel to one another within about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

The present invention will be better understood by reference to the Detailed Description Section of this Specification, in combination with reference to the Drawings.

BRIEF DESCRIPTION OF THE DRAWINGS

FIGS. 9a, 9b, 10a and 10b show that the most useful property of the new retarder design is that as the angle of the input beam is changed, the resulting transmitted bean angle does not change.

FIGS. 11a-11f show very small beam polarization change, in terms of PSI and DELTA, for a given change in beam angle.

FIG. 12a demonstrates translation and rotation capability for an element of a two sequential element retarder system.

FIG. 12b shows a two wedge system which allows for relative rotation therebetween.

DETAILED DISCLOSURE OF THE INVENTION

Figure 1:
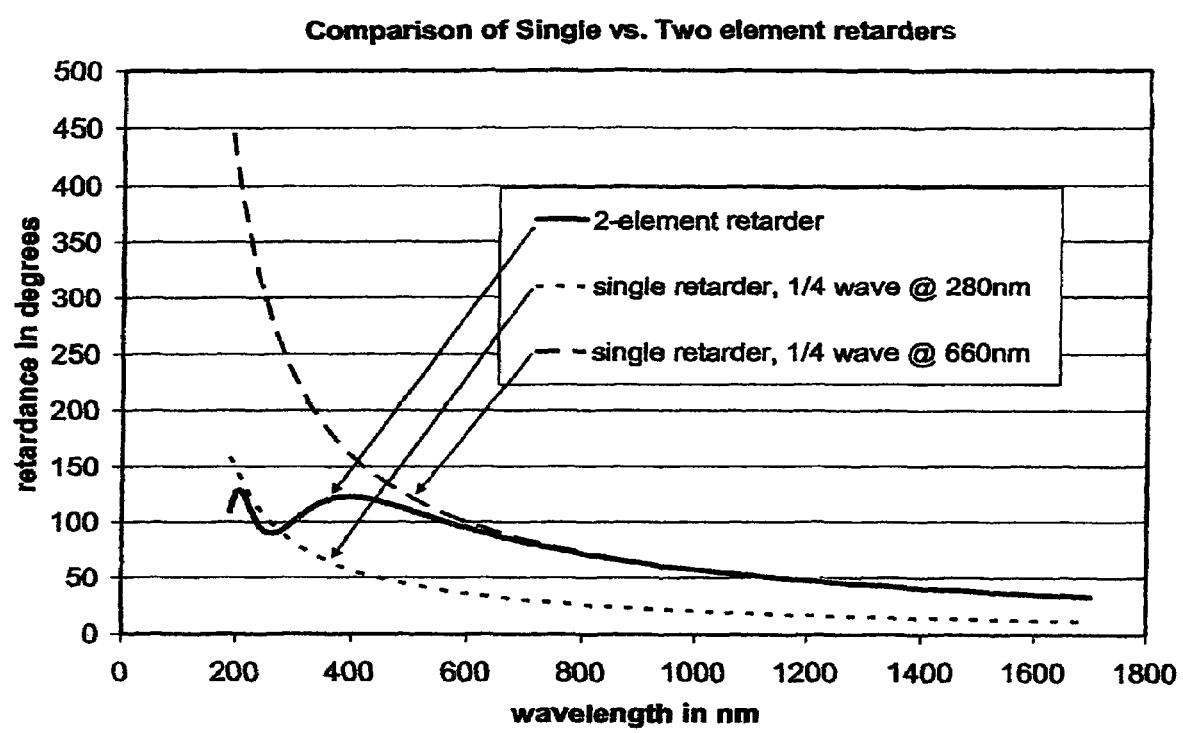
FIG. 1 shows retardance results from a retarder comprising two birefringent waveplates over a spectroscopic range.
Figure 2:
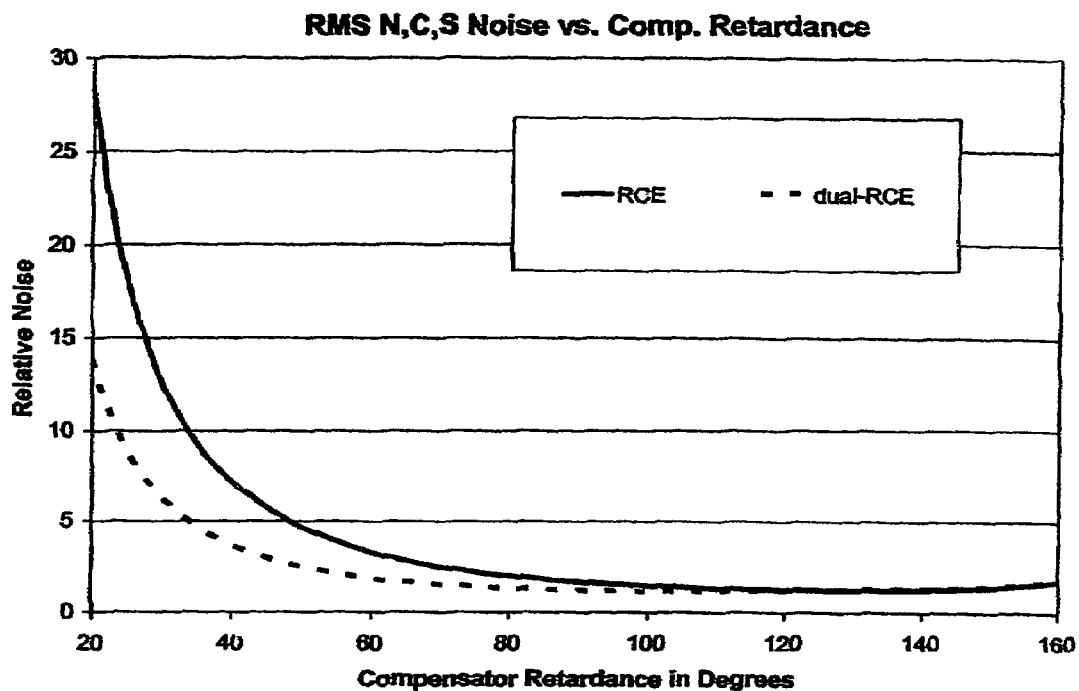
FIG. 2 shows the Root Mean Squared (RMS) noise in ellipsometric parameters N, C and S.

Turning now to FIG. 1, as introduction, results from a retarder comprising two birefringent waveplates are shown. Note that the retardance varies from 35-130 degrees over the typical UV-VIS-NIR spectral range of 190-1700 nm. FIG. 2 shows the Root Mean Squared (RMS) noise in the ellipsometric parameters;

$N = \cos(2\psi);$ $C = \sin(2\psi)\cos(\Delta);$ and $S = \sin(2\psi)\sin(\Delta);$ for the rotating compensator ellipsometer (RCE) and dual rotating compensator ellipsometer (dual-RCE) configurations as a function of compensator retardance. See FIG. 13 for insight to the construction of a rotating compensator ellipsometer (RCE) with one or two of the shown Compensators (C), (C') (C") considered as present. Continuing, for said rotating compensator ellipsometer (RCE) configuration it is disclosed that it has been determined to be beneficial to keep the retardance between 80 and 160 degrees, as this keeps the relative RMS N, C, S noise to less than 2.0. In that regard the dual-RCE configuration is slightly more forgiving over the retardance range is 60-160 degrees. It should be appreciated that FIGS. 1 and 2 show that using birefringent waveplates through which a beam of electromagnetic radiation is caused to pass, in wide spectral range rotating compensator ellipsometer systems, compromises the noise performance of the system.

In view of the above disclosure, it is disclosed that an alternative approach to effecting retardance is by total internal reflection. FIGS. 3a and 3b show Generated (Gen) retardance vs. total internal reflection angle and wavelength, (at a given angle), for the fused silica/air interface. Note that the change in retardance vs. wavelength for total internal reflectance is very small compared to the retardance induced by the (1/wavelength) dependence of birefringence-induced retardance. Fresnel rhomb retarders which are based on this effect are readily available. However, a typical ¼ wave Fresnel rhomb design translates the beam significantly, and the retardance also changes significantly as a function of beam angle, making it impractical to use a Fresnel rhomb in a rotating compensator style ellipsometer or polarimeter design. FIG. 4a shows a Typical Wave ¼ wave 90 degree retardance Fresnel Rhomb and demonstrates the translation effect. FIG. 4b shows a known approach to combining two Fresnel Rhombs to achieve a substantially non-translated beam. The rhombs each have first (RS1), second (RS2), third (RS3) and forth (RS4) sides, said first (RS1) and third (RS3) sides being substantially parallel to one another, and said second (RS2) and forth (RS4) sides being substantially parallel to one another, said first (RS1) and second (RS2), and said third (RS3) and forth (RS4) sides of said first Freshnel Rhomb meeting one another at angles greater than ninety degrees therebetween, and said second (RS2) and third (RS3) sides and said first (RS1) and forth (RS4) sides thereof meeting one another at angles less than ninety degrees therebetween. Note that said at least two parallelogram shaped rhombs are oriented with their first (RS1) and third (RS3) sides being substantially parallel to one another. In use a beam of electromagnetic radiation caused to enter the first (RS1) side of the first Freshnel Rhomb, at a substantially normal angle thereto, then proceeds so that it internally reflects from said forth (RS4) and second (RS2) side thereof, then exits said third (RS3) side thereof in a direction such that it then enters the first (RS1) side of the second Freshnel Rhomb at a substantially normal angle thereto, then proceeds so that it internally reflects from said second (RS2) and forth (RS4) side thereof, then exits said third (RS3) side thereof. Said system is distinguished over known configurations in that it is characterized in that at least one of the sides (RS1) (RS2) (RS3) (RS4) of at least one of the parallelogram shaped rhombs has a coating thereupon which has a different refractive index than does the material from which said corresponding parallelogram shaped rhomb is comprised. Preferred practice is to coat sides (RS2) and (RS4) of each rhomb. The angles of the parallelogram shaped rhomb can be 36, 144, 36, and 144 degrees or 45, 135, 45 and 135 degrees, and the rhombs can be fabricated from fused silica, with the coating being a material, (eg. $MgF_2$), with a lower refractive index.

Figure 4C:
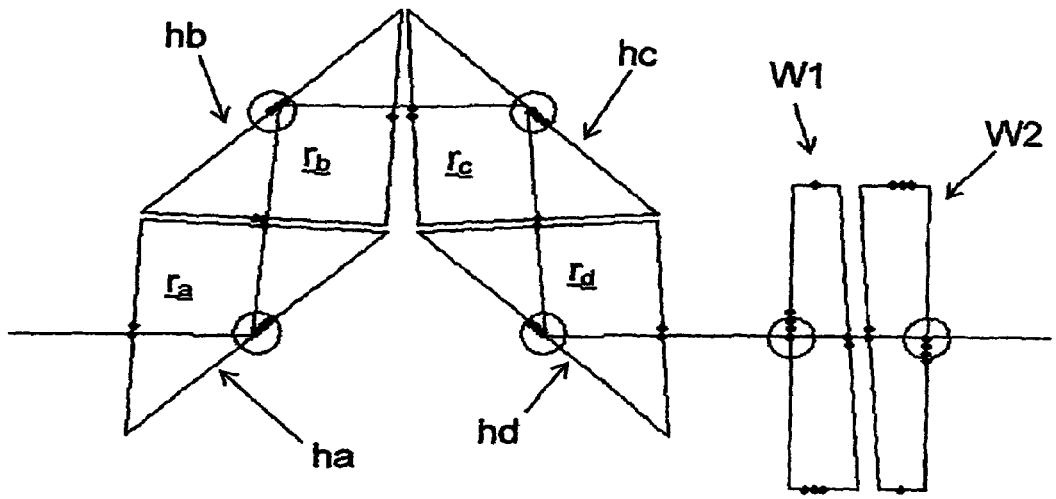
FIG. 4c shows a variation on the FIG. 4b system comprising four right angle prisms and optional wedge elements as also shown in FIG. 12b.
Figure 4A:
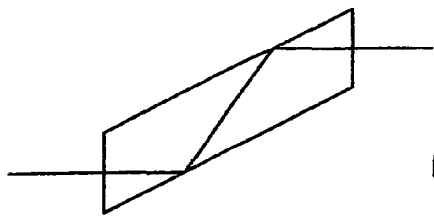
FIG. 4a shows a Typical ¼ Wave 90 degree retardance Fresnel Rhomb and demonstrates the translation effect.
Figure 4B:
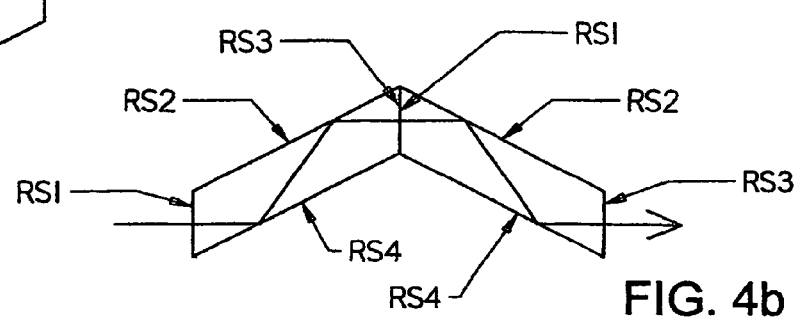
FIG. 4b shows how two Fresnel Rhombs can be combined to result in an angularly non-deviated beam.
Figure 4D:
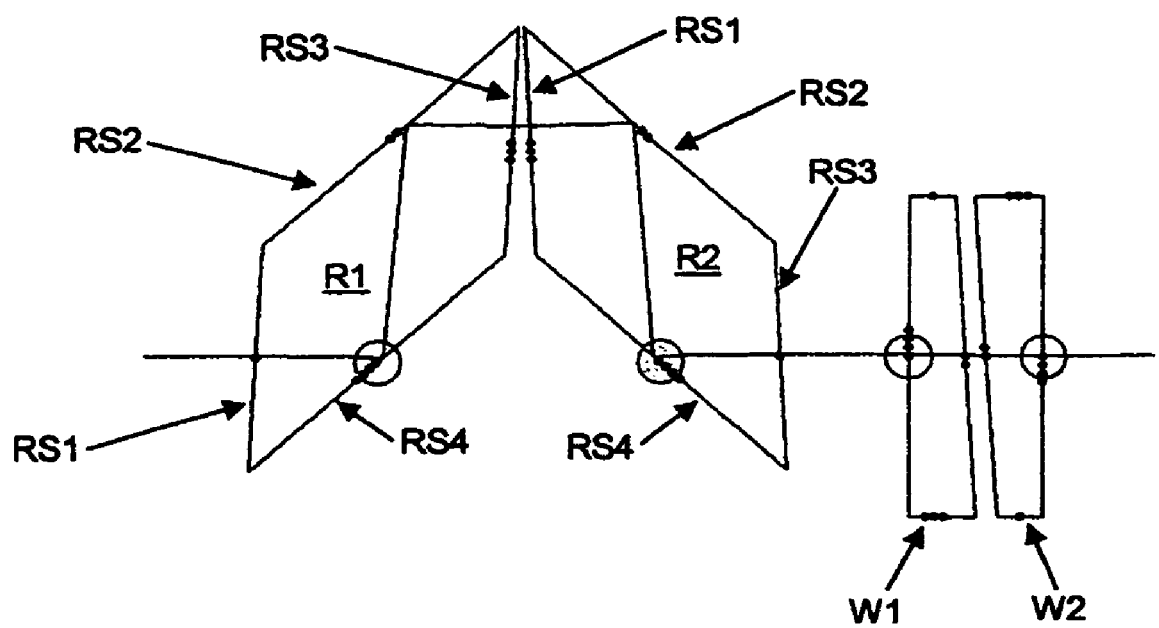
FIG. 4d shows how two Fresnel Rhombs, each of which is equivalent to two right angle prisms in FIG. 4c, and two wedges, can be combined to result in an angularly non-deviated beam.

FIG. 4c shows a variation on FIG. 4b which is believed new and novel even without surface coatings. Shown are four similar right angle prisms, (ie. first (ra), second (rb), third (rc) and forth (rd)), having sides opposite their right angles of, respectively, (ha) (hb) (hc) and (hd). As viewed in FIG. 4c the first right angle prism (ra) is positioned so that its side (ha) opposite the right angle thereof is facing downward and to the right. Directly above the first right angle prism (ra) is the second right angle prism (rb), which is oriented so that its side (hb) opposite the right angle thereof is facing upward and to the left. Directly to the right of the second right angle prism (rb) is the third right of right angle prism (rc) which is oriented so that its side (hc) opposite the right angle thereof is facing upward and to the right. Finally, positioned directly below the third right angle prism (rc) is the forth right angle prism (rd), oriented so that its side (hd) opposite the right angle thereof is facing downward and to the left. Note that the sides of each element (ra) (rb) (rc) and (rd) adjacent to the right angles thereof are identifiable as "right angle sides". It is also noted that the sides of elements (ra) (rb) (rc) and (rd) opposite the right angles can be coated with a material of different refractive index material, (eg. where said elements are made of fused silica the coating can be, for instance, 35 nm of lower index MgF$_2$). Such a coating makes the retardance entered by a total internal reflection from a side opposite the right angle thereof substantially achromatic with range of retardation. Also shown in FIG. 4c are two optional Wedge Elements (w1) and (w2), the purpose of which is described with respect to FIG. 12b. It is also noted that the design of FIG. 4b is believed to be new and novel when a coating is applied to a reflective outer surface thereof. FIG. 4d shows how two Fresnel Rhombs (R1) (R2) which are equivalent to the four right angle prisms (ra)+(rb) and (rc)+(rd) of FIG. 4c, and two wedges (w1) (w2), can be combined to result in an angularly non-deviation of a beam (B) caused to pass therethrough. The angles of the Rhombs are 45, 135, 45 and 135 degrees. Coatings with a different refractive index from that of the material from which the Rhomb is comprised can be present on surfaces thereof as well, much as for the system in FIG. 4b.

It is noted that when applying the embodiments of FIGS. 4b and 4d, the Beam (B) is typically not entered exactly along a normal to the surface entered, (eg. (RS1) in FIG. 4d). This diverts unwanted depolarizing secondary bounces out of the primary beam and such a beam entry locus can be termed "substantially normal" to the surface where the off-normal angle is sufficient to divert said reflections. A typical off-normal angle is about three (3) degrees which angularly deviates transmitted secondary beams by about six (6) degrees. This is sufficient to provide separation from the primary transmitted beam. Also, as presented with respect to FIG. 12b, the Wedges (w1) (w2) can be rotated with respect to one another and/or simultaneously to result in an angularly non-deviated beam, (B).

Figure 3C:
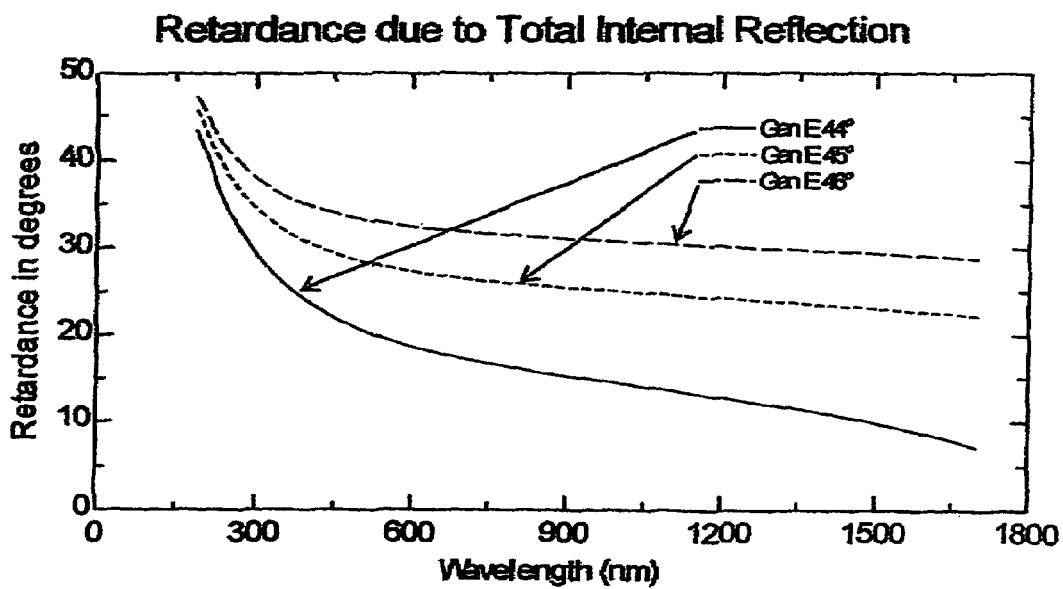
FIG. 3c shows retardance vs. and wavelength, (at a given angle), for the fused silica/air interface for a system as shown in FIG. 4c.
Figure 3A:
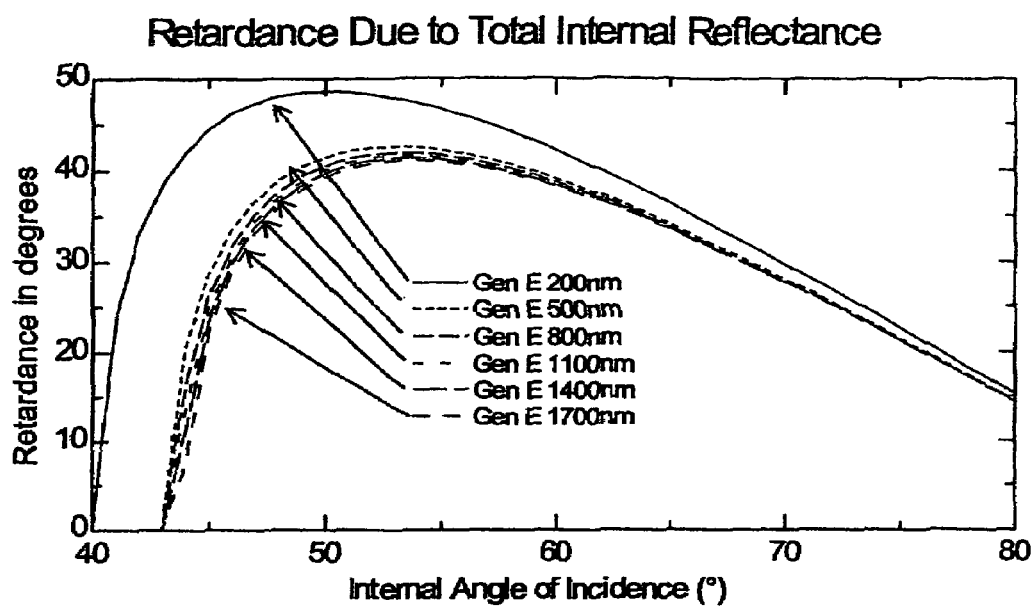
FIGS. 3a and 3b show retardance vs. internal angle and wavelength, (at a given angle), for the fused silica/air interface.
Figure 3B:
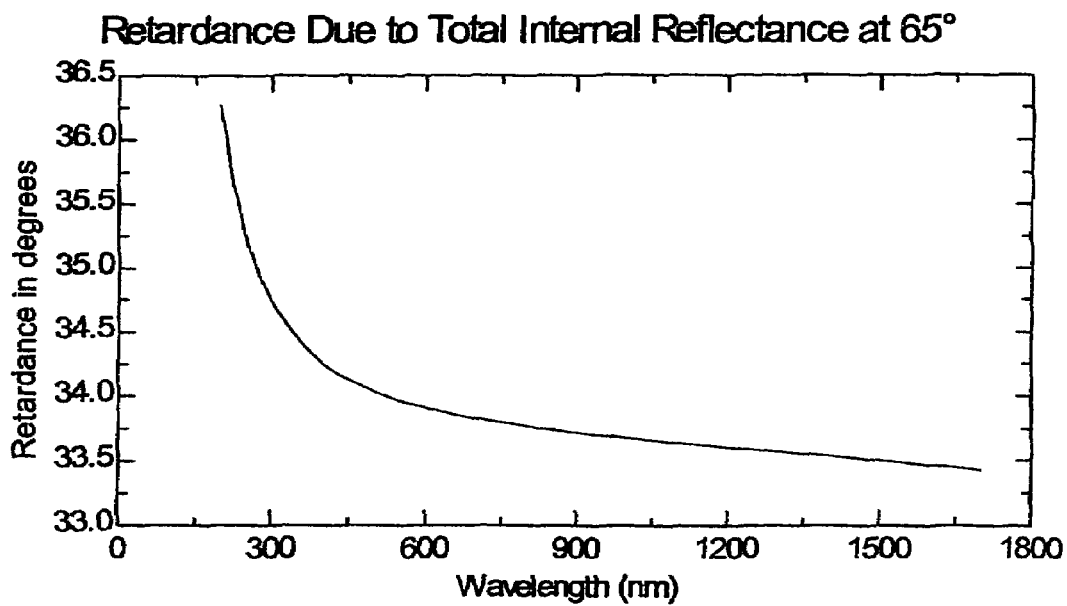
Figure 3D:
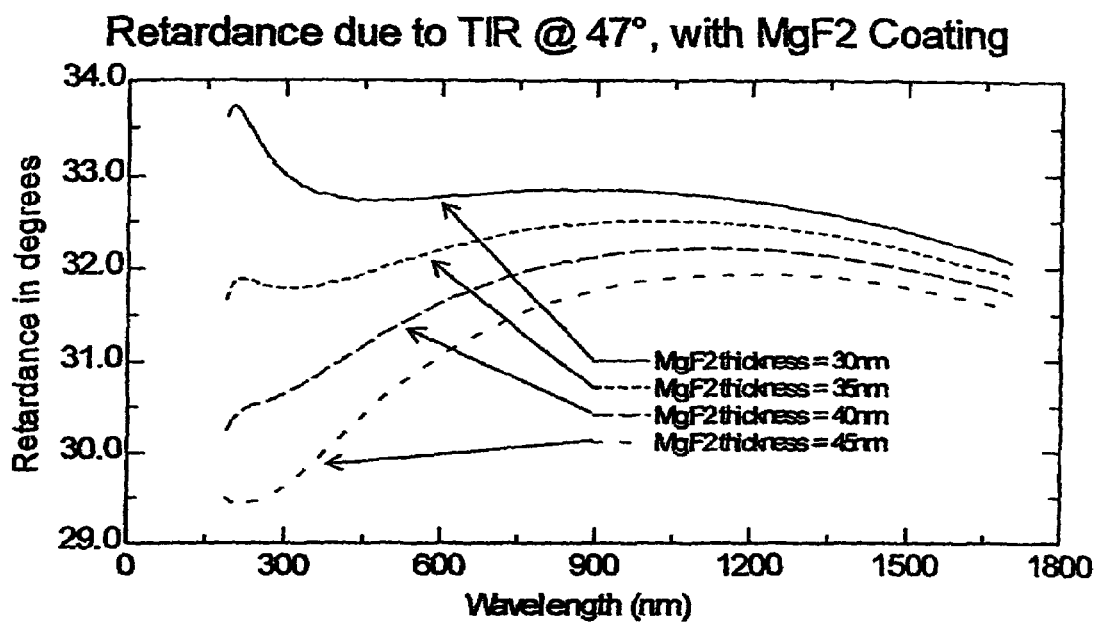
FIG. 3d show results as In FIG. 3c, but for a system having a different refractive index coating on reflective surfaces of a system as shown in FIG. 4c.

FIG. 3c shows retardance vs. total internal reflection angle and wavelength, (at a given angle), for the fused silica/air interface for a system as shown in FIG. 4c, and FIG. 3d show results as in FIG. 3c, but for a system having a different refractive index coating on reflective surfaces of a system as shown in FIG. 4c. FIGS. 3a and 3c indicate that near a 45 degree angle of incidence the retardance varies strongly as a function of both wavelength and angle of incidence. A total retardance, resulting from four reflections, varies between 180 degrees at 190 nm to less than 90 degrees at 1700 nm. FIG. 3d indicates that including a coating on the side of the elements (ra) (rb) (rc) and (rd) opposite their right angle can make said result more achromatic. For instance, where the elements (ra) (rb) (rc) and (rd) are made from Fused Silica, and the coatings are between 30-45 nm of MgF$_2$, the total retardance for four total internal reflections in the described system is between 116 and 136 degrees over a range of wavelengths of 190 nm-1700 nm.

Figure 5:
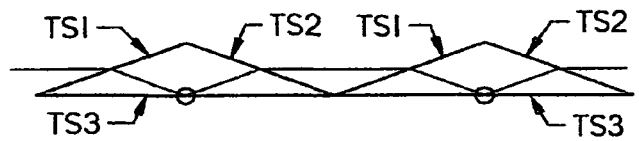
FIG. 5 shows two triangular isosceles prisms, with angles of 26, 128, and 26 degrees.

Continuing, the present invention retarder design uses an even number of multiple total internal reflections to provide the desired amount of retardance. Furthermore, the geometry of the reflections is such that a given change in the input beam angle causes opposite changes in the internal angles of reflection, and therefore. (since the slope of the retardance vs. total internal reflection angle curve, (see FIG. 3a), above is relatively linear over small angle ranges), the net retardance of the system does not change to the 1st order for small changes in the angle of beam entrance. One embodiment of the new retarder system is shown in FIG. 5. Shown are two triangular isosceles prisms, each with angles of 26, 128, and 26 degrees. Each triangular shaped prisms each has:

first (TS1) and second (TS2) sides of equal length which project from one another at an angle greater than ninety degrees therebetween, and a third side (TS3) oriented opposite said greater than ninety degree angle, said at least two similar triangular shaped prisms being oriented with respect to one another such that the third (TS3) sides thereof are substantially colinear;

such that a beam of electromagnetic radiation caused to enter the first side of the first thereof, at a non-normal angle thereto, is refracted so that it internally reflects from said third side thereof, then exits said second side thereof in a direction such that it then enters the first side of another thereof at a non-normal angle thereto, is refracted so that it internally reflects from said third side thereof, then exits said second side thereof. The prisms can be fabricated from fused silica.

Figure 6:
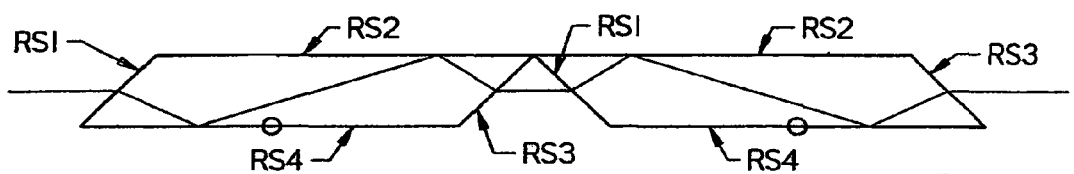
FIG. 6 shows two parallelogram rhombs, with angles of 36, 144, 36, and 144 degrees.
Figure 7A:
FIGS. 7a, 7b, 8a and 8b show that if the elements are translated up or down, the exiting beam is unchanged.
Figure 7B:
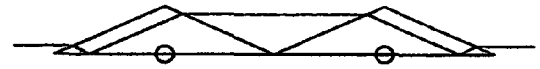
Figure 8A:
Figure 8B:
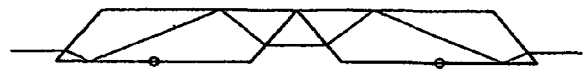

Another embodiment of the new retarder system is shown in FIG. 6. Shown are two parallelogram rhombs, with angles of 36, 144, 36, and 144 degrees. Said parallelogram shaped rhombs, each have first (RS1), second (RS2), third (RS3) and forth (RS4) sides, said first (RS1) and third (RS3) sides being substantially parallel to one another and said second (RS2) and forth (RS4) sides being substantially parallel to one another, said first (RS1) and second (RS2), and said third (RS3) and forth (RS4) sides of the first parallelogram shaped rhomb meeting one another at angles greater than ninety degrees therebetween, and said second (RS2) and third (RS3) sides and said first (RS1) and forth (RS4) sides thereof meeting one another at angles less than ninety degrees therebetween. Said at least two parallelogram shaped rhombs are oriented with their second (RS2) sides being substantially colinear and with their forth (RS4) sides thereof being substantially colinear, such that a beam of electromagnetic radiation caused to enter the first side (RS1) of the first parallogram shaped rhomb, at a non-normal angle thereto, is refracted so that it internally reflects from said forth (RS4) and second (RS2) sides thereof, then exits said third (RS3) side thereof in a direction such that it then enters the first (RS1) side of the second thereof at a non-normal angle thereto, is refracted so that it internally reflects from said second (RS2) and forth (RS4) side thereof, then exits said third (RS3) side thereof. The parallelogram shaped rhomb can be fabricated from fused silica.

Note that both the FIG. 5 and FIG. 6 embodiments have input and output surfaces into which a beam is entered, and out of which is exits, respectively, said surfaces serving to refract the beam in use. Other surfaces at which total internal reflection occurs are used to enter retardance. It is noted that the Fresnel losses at the refracting interfaces result in a relative attenuation for orthogonally polarized beams. The orthogonal beams are typically denoted p and s for light polarized parallel and perpendicular to the plane of incidence. The relative attenuation and retardation of an optical element can be quantified by the equation below, which is similar to the standard ellipsometry definition. In this case, Tp and Ts are the complex amplitudes of the orthogonal beams which are transmitted through the prism, ($\psi$) is the relative attenuation, and ($\Delta$) is the retardance:

$$Tp/Ts = \tan(\psi) e^{i(\Delta)}.$$

An ideal retarder changes only the relative p-to-s phase, (ie. the retardation), of the beam, and for said case ($\psi$)=45 degrees. For the current invention, the ($\Delta$) value depends on the number and angle of refracting surfaces in the design. For the triangle design ($\psi$) is about 57 degrees, and for the rhomb design ($\Delta$) is about 53 degrees. Since ($\psi$) is dependent on the index of refraction, it varies a few degrees over the 190-1700 nm spectral range). While the ($\psi$) value of the retarder does have to be determined in the ellipsometer/polarimeter system calibration, the sensitivity and accuracy of the instrument has been found to not be significantly degraded as long as ($\psi$) is not too far from 45 degrees. It is noted that the beam enters and exits the elements at near a Brewster angle of incidence, hence substantially 100% of the p polarized light is transmitted through the system.

The geometry and symmetry of the elements results in a number of very useful properties. For example, FIGS. 7a, 7b, 8a and 8b show that if the sequential elements are translated up or down as a unit, the exiting beam remains collinear with the input beam. If the sequential elements are rotated, FIGS. 9a, 9b, 10a and 10b show that the exiting beam angle is unchanged, (though it is slightly translated).

FIGS. 11a, 11b, 11c, 11d, 11e, 11f show that the most useful property of the new retarder design is that as the angle of the input beam is changed, the resulting polarization properties ($\psi$) and ($\Delta$) change very little. This is because the geometry and symmetry of the designs are such that changes in the refraction and total internal reflection angles have opposite signs for the two elements shown in the system of FIGS. 7a, 7b, 8a and 8b, which in turn cancels change in ($\psi$) and ($\Delta$) vs. input beam angle to a 1st order approximation. To give a feel for the results achieved by a present invention system, typically the change in ($\psi$) and ($\Delta$) for a one degree change in beam angle is approximately 0.01 degree. Note that FIGS. 11a-11f show that:

Beam angle=+1 degrees, ($\psi$)=56.953, ($\Delta$)=70.425;

Beam angle=0 degrees, ($\psi$)=56.940, ($\Delta$)=70.419;

Beam angle=−1 degrees, ($\psi$)=56.953, ($\Delta$)=70.425;

Beam angle=+1 degrees, ($\psi$)=52.357, ($\Delta$)=114.232;

Beam angle=0 degrees, ($\psi$)=52.349, ($\Delta$)=114.221;

Beam angle=−1 degrees, ($\psi$)=52.357, ($\Delta$)=114.232.

The net relative attenuation and retardance ($\psi$) and ($\Delta$) of the system can be controlled by adjusting the number of total internal reflections (determined by the number and length of the elements), the angles of refraction and reflection (determined by the prism and/or rhomb angles), and the material used to fabricate the elements.

Any transparent, optically isotropic material can be used for the elements, though care should be taken in mounting the elements to minimize strain-induced birefringence. Fused silica is ideal for the UV-VIS-NIR spectral range, but $CaF_2$ is preferable in the DUV, and Si, Ge, ZnSe, KRS5, etc. are suited for use in the IR. Presently, preferred embodiment designs use fused silica, and have the following properties over a wide 190-1700 nm spectral range:
  triangular prisms:
    ($\psi$)=56.382-59.286;
    ($\Delta$)=67.801-81.290;
  parallelogram rhombs:
    ($\psi$)=51.976-59.271;
    ($\Delta$) 109.795-135.701.
Said examples are not to be considered limiting, however, and other designs are possible, using different materials, angles, and/or geometries. For instance, it might be beneficial to provide for substantially normal angle entry and exit thereby avoiding the effect on ($\psi$), but the key element of any design is that symmetry is employed to enable the following properties:
  1. The locus of the beam is not angularly deviated as the system is translated;
  2. The angle of the beam locus is not angularly deviated as the system is rotated;
  3. The change in polarization properties are minimal for changes in the input beam angle.

Another beneficial aspect of the disclosed design is that, since at least two elements are present, if the elements are not perfectly fabricated and/or aligned, the height and/or tilt of at least one of the elements can be adjusted with respect to the other such that the input beam is substantially angularly undeviated in position and angle by the system. FIG. 12a demonstrates a system for accomplishing this by allowing translation and/or rotation of an element, and FIG. 12b shows an additional sequential two wedge (w1) (w2) system wherein relative rotation of one wedge with respect to the other provides a similar benefit. A system can then include at least one selection from the group consisting of:
  at least one of the sequential elements has a mechanism for translating and/or tilting the element, for the purposes of aligning the system such that the output beam is substantially angularly undeviated from said input beam;
  there is present an additional sequential two wedge system wherein relative rotation of one wedge with respect to the other and/or combined wedge rotation can be performed for the purposes of aligning the system such that the output beam is substantially angularly undeviated from said input beam.

It is also noted that when practicing Beam (B) angular deviation correction via Wedge (w1) (w2) rotations, relative rotation of one wedge with respect to the other and combined rotations of both Wedges (w1) and (w2) can be practiced.

It is noted that while not shown or preferred, a system could comprise such as one Triangular shaped element and one Trapezoidal shaped element. Such an arrangement can be viewed as a sequence of a FIG. 9a and FIG. 10a embodiment, perhaps with one of the FIG. 9a prisms removed and with one of the FIG. 10a rhombs removed. Careful attention to preserving effective symmetry is required in any such embodiment, however.

It is also noted that only a single primary beam is transmitted through the disclosed systems, as the secondary reflections from the refracting interfaces do not re-enter the primary beam path. This means that only a single polarization state is present in the transmitted beam. In contrast, multiple reflections from the parallel surfaces of birefringent plate retarders result in beam depolarization which can degrade the ellipsometer/polarimeter accuracy if not priperly taken into account.

Figure 13:
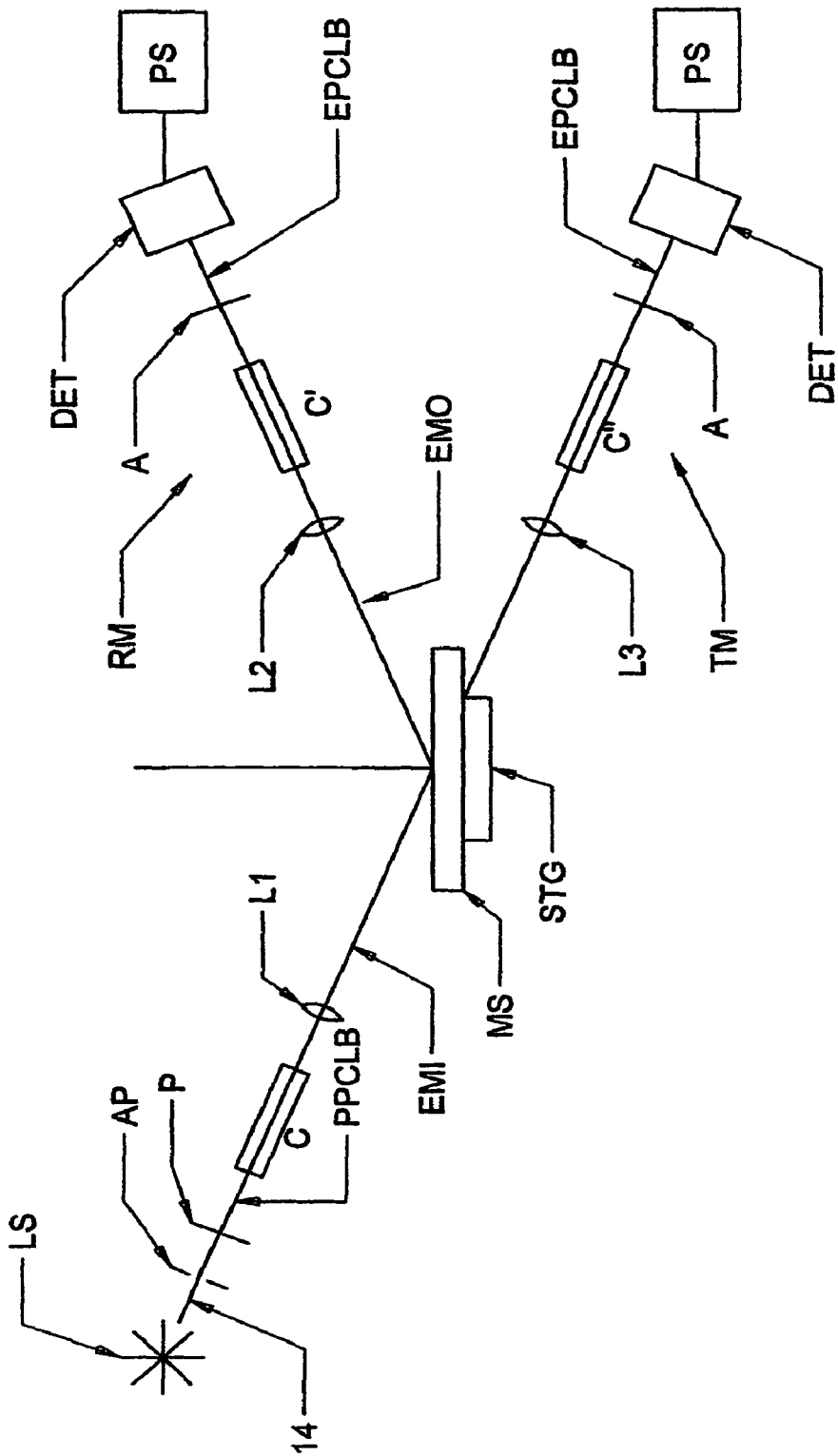
FIG. 13 shows a basic ellipsometer or polarimeter comprising at least one rotatable compensator system.

As a primary use of the sequential element system is in ellipsometer and polarimeter systems, FIG. 13 is included to show an ellipsometer or polarimeter system which, for each of a Reflection and Transmission mode, comprises:
  a) a source (LS) of electromagnetic radiation;
  b) a polarizer (P);
  c) a stage (STG) for supporting a sample (MS);
  d) an analyzer (A); and
  e) a detector (DET);
said ellipsometer or polarimeter system further comprises at least one rotatable compensator (C) (C') (C") present at least one location selected from the group consisting of:
  between said source (LS) of electromagnetic radiation and said stage (STG) for supporting a sample (MS); and
  between said stage (STG) for supporting a sample (MS) and said detector (DET);
said at least one rotatable compensator (C) (C') (C") comprising at least two sequential elements oriented with respect to one another such that said entered electromagnetic beam undergoes total internal reflection at least once in each of the elements, with the orientation, geometry, and symmetry of the elements being such that the output beam position is angularly undeviated by a translation of the system, and the output beam angle is angularly undeviated by a rotation of the system. Again, one embodiment provides that two triangular shaped prisms are used for the elements. Preferred design provides that the angles of the triangular prisms are 26, 128, and 26 degrees, and fabrication of the prisms can be from fused silica. Another embodiment provides that two parallelogram shaped rhombs are used for the elements. Preferred design provides that angles of the parallelogram shaped rhombs are 36, 144, 36, and 144 degrees, and again, fabrication of the parallelogram can be from fused silica. Also, as mentioned other embodiments can include one or more triangular shaped prisms and one or more parallelogram shape rhombs etc. Further, at least one of the elements can have a mechanism for translating and/or tilting at least one of the elements, for the purposes of aligning the system such that the locus of the exiting beam is substantially angularly undeviated in position and angle from the locus of the input beam.

Figure 14:
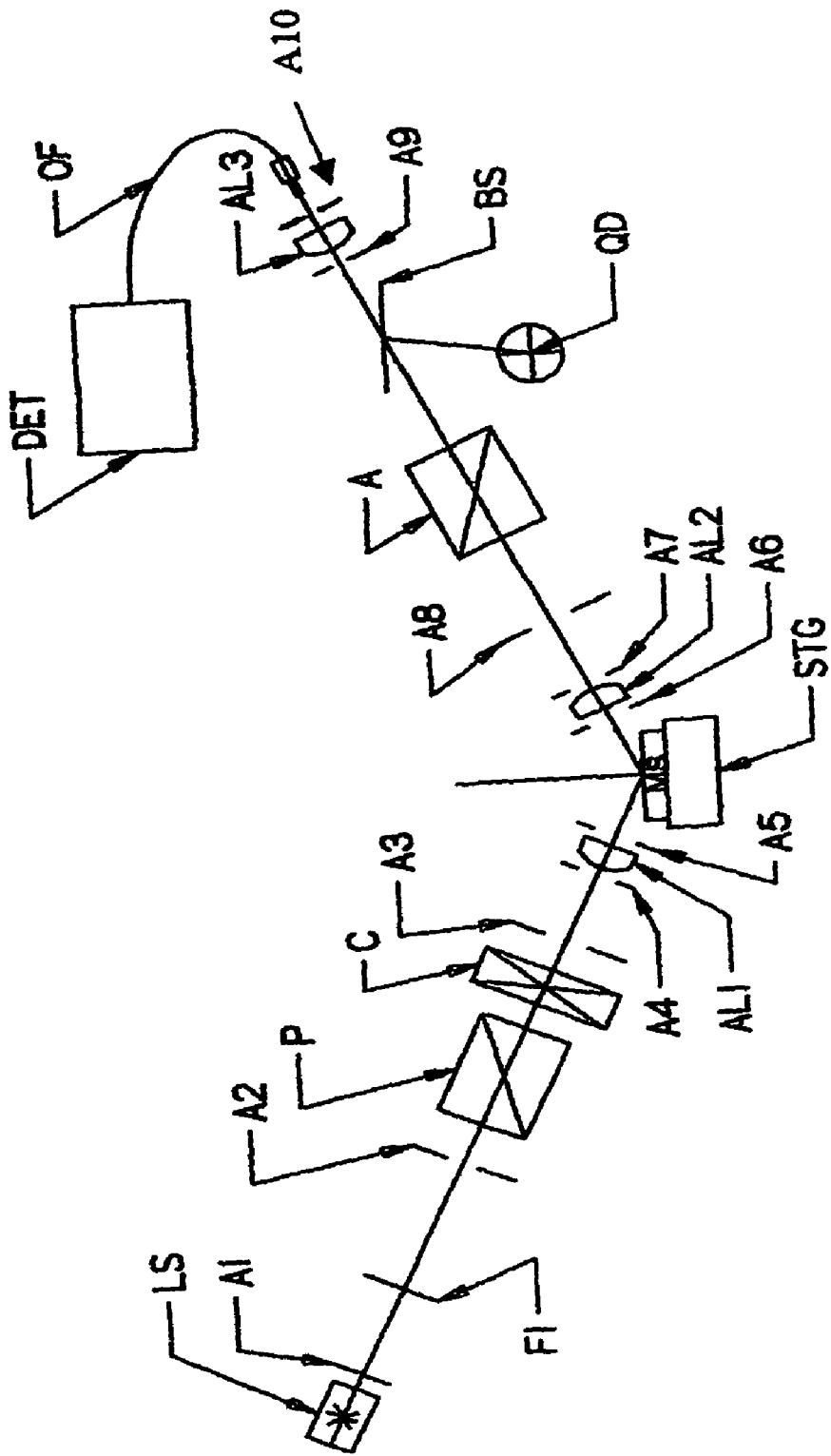
FIG. 14 shows a spectroscopic rotating compensator material system investigation system.

FIG. 14 shows that a present invention ellipsometer or polarimeter system, comprising a source (LS) of polychromatic beam of electromagnetic radiation, a first aperture (A1), a second aperture (A2), a fixed polarizer (P), a rotating compensator (C), a third aperture (A3), a forth aperture (A4), a first substantially achromatic lens (AL1), a fifth aperture (A5), a stage (STG) for supporting a material system, a sixth aperture (A6), a second substantially achromatic lens (AL2), a seventh aperture (A7), an eighth aperture (A8), a fixed analyzer (A), a ninth aperture (A9), a third substantially achromatic lens (AL3), an optical fiber (OF) and a detector system (DET) which contains a dispersive element and a multiplicity of detector elements, there further being a UV filter (F1) present between said source (LS) of polychromatic beam of electromagnetic radiation and said stage (STG) for supporting a material system. When said spectroscopic rotating compensator material system investigation system is used to investigate a material system (MS) present on said stage (STG) for supporting a material system, said fixed analyzer (A) and fixed polarizer (P) are maintained essentially fixed in position and said rotating compensator (C) is caused to continuously rotate while a polychromatic beam of electromagnetic radiation produced by said source (LS) of a polychromatic beam of electromagnetic radiation is sequentially caused to pass through said first aperture (A1), second aperture (A2), fixed polarizer (P), rotating compensator (C), third aperture (A3), forth aperture (A4), first substantially achromatic lens (AL1), fifth aperture (A5), said polychromatic beam of electromagnetic radiation also passing through said UV filter, then interact with a material system (MS) placed on said stage (STG) for supporting a material system (MS), then sequentially pass through said sixth (A6) aperture, second substantially achromatic lens (AL2), seventh aperture (A7), eighth aperture (A8), fixed analyzer (A), ninth aperture (A9), third substantially achromatic lens (AL3), optionally pass through a beam shaping aperture (A10), and then enter said optical fiber (OF) and therevia enter said detector system (DET).

Figure 15:
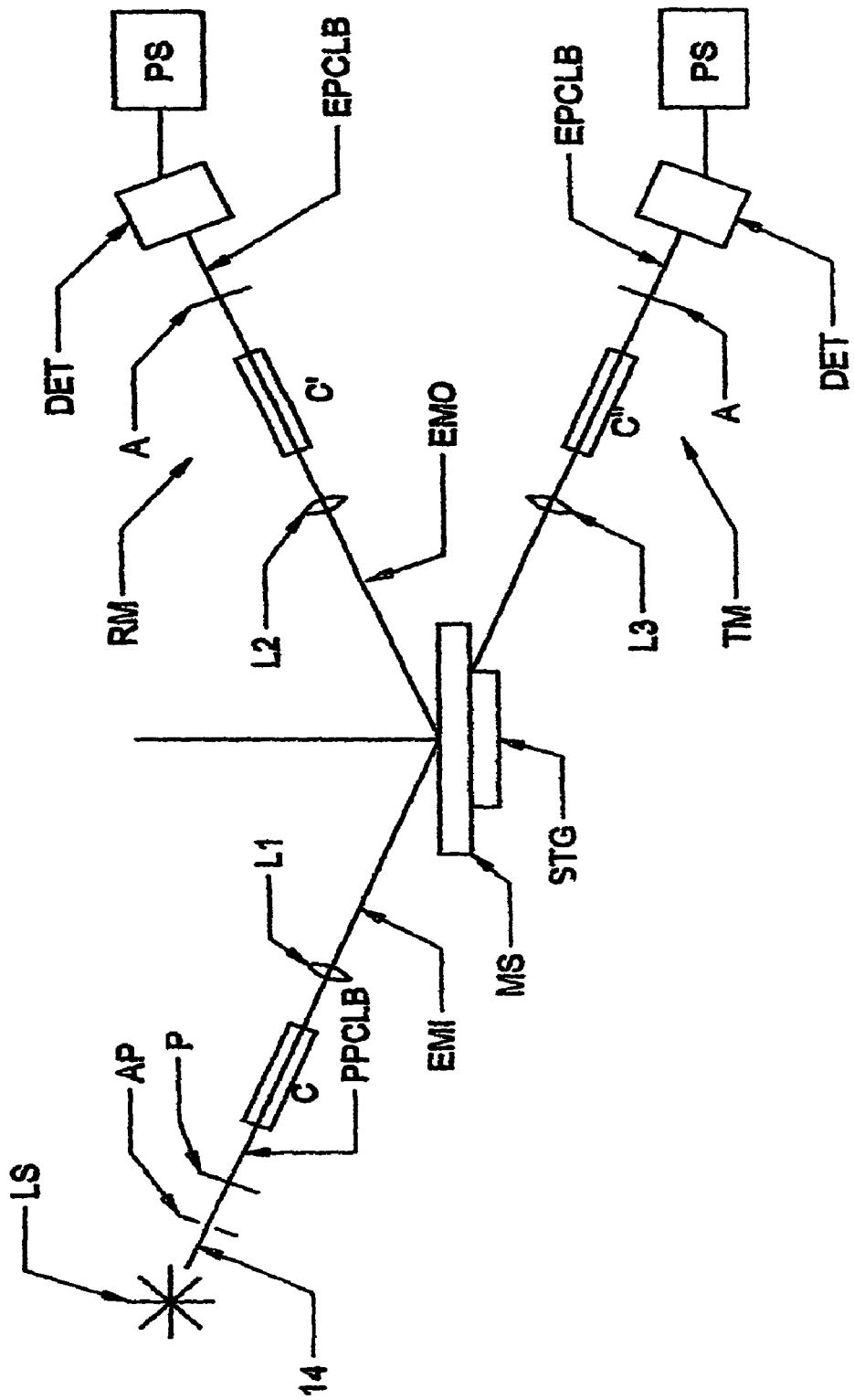
FIG. 15 shows that a present invention ellipsometer or polarimeter system.

FIG. 15 shows that a present invention ellipsometer or polarimeter system, for each of a Reflection and Transmission mode, can comprise:
 a) a source (LS) of electromagnetic radiation;
 b) a polarizer (P);
 c) a stage (STG) for supporting a sample (MS);
 d) an analyzer (A); and
 e) a detector (DET);

said ellipsometer or polarimeter system further comprises at least one rotatable compensator (C) (C') (C") present at least one location selected from the group consisting of:
 between said source (LS) of electromagnetic radiation and said stage (STG) for supporting a sample (MS); and
 between said stage (STG) for supporting a sample (MS) and said detector (DET);
said at least one rotatable compensator (C) (C') (C") comprising at least two sequential elements oriented with respect to one another such that said entered electromagnetic beam undergoes total internal reflection at least once in each of the elements, with the orientation, geometry, and symmetry of the elements being such that the output beam position is angularly undeviated by a translation of the system, and the output beam angle is undeviated by a rotation of the system. Again, one embodiment provides that two triangular shaped prisms are used for the elements. Preferred design provides that the angles of the triangular prisms are 26, 128, and 26 degrees, and fabrication of the prisms can be from fused silica. Another embodiment provides that two parallelogram shaped rhombs are used for the elements. Preferred design provides that angles of the parallelogram shaped rhombs are 36, 144, 36, and 144 degrees, and again, fabrication of the parallelogram can be from fused silica. Also, as mentioned other embodiments can include one or more triangular shaped prisms and one or more parallelogram shape rhombs etc. Further, at least one of the elements can have a mechanism for translating and/or tilting at least one of the elements, for the purposes of aligning the system such that the locus of the exiting beam is substantially angularly undeviated in position and angle from the locus of the input beam.

It is also mentioned that in the following it will be generally assumed that a Material System (MS) under investigation by a Spectroscopic Rotating Compensator Material System Investigation System is positioned upon the Material System Supporting Stage (STG). This need not be the case, as is described in U.S. Pat. No. 5,706,087 wherein a Material System (Sample), (MS) can be positioned in a Magneto-Optic System which is physically too large to be supported by said Material System Supporting Stage (STG), or in an environmental control chamber. Further, especially where Ultraviolet range wavelengths are utilized, the system of FIG. 13, 14 or 15 can be placed into an evacuated or purged, (eg. by nitrogen or argon), Chamber to the end that UV absorbing Oxygen and Water Vapor are not present therewithin. The entire FIG. 13, 14 or 15 system can be so encompassed within a said Chamber, or only the Sample (MS) Stage portion thereof. The Chamber can be of multiple region construction and can be interpreted to contain one or multiple interior regions. For instance the FIG. 1 Pre-(MS) Polarization State Generator (PSG) and Post-(MS) Polarization State Detector (PSD) can be open to a region containing the Material System (MS), or can be considered to be sequestered by (AC1) and (AC2) so that the internal environments available to each can be controlled to be are the same or different. More specifically, the environmental chamber can have a configuration characterized by a selection from the group consisting of:
 it comprises at least one chamber region in which is present polarization state generator (PSG) comprising component(s) prior to said material system, said material system (MS), and polarization state detector (PSD) comprising component(s) after said material system;
 it comprises at least three chamber regions, in one of which is present polarization state generator (PSG) comprising component(s) prior to said material system (MS), in the second of which is present the material system (MS) and in the third of which is present polarization state detector (PSD) comprising component(s) after said material system (MS);

it comprises at least two chamber regions, in one of which is present polarization state generator (PSG) comprising component(s) prior to said material system (MS) and said material system (MS), and in the second of which is present polarization state detector (PSD) comprising component(s) after said material system MS;

it comprises at least two chamber regions, in one of which is present polarization state generator comprising component(s) prior to said material system, and in the second of which is present polarization state detector comprising component(s) after said material system and said material system.

The environment in any chamber region can be individually controlled, or the environment in all chamber regions can be similarly controlled. This includes allowing the chamber regions containing the polarization state generator (PSG) and the polarization state detector (PSD) to be in ambient with only a material system (MS) under investigation being in a Controlled Environment (SES). The functional purpose is to avoid attenuation of wavelengths (eg. UV) by the presence of oxygen or water vapor etc.

It is noted that the coating of, for instance, a material of different refractive index material, (eg. where said elements are made of fused silica the coating can be, for instance, 35 nm of $MgF_2$, which has a lower index), applied to a totally internally reflecting surface described with respect to FIGS. 4b and 4c can be applied in any of the embodiments in FIGS. 5, 6 7a, 7b, 8a, 8b, 9a, 9b, 10a, 10b, 11a-11f and 12a and 12b. Further, such a coating can be beneficially placed on non-totally internally reflecting surfaces thereof to reduce reflections therefrom It is noted that as regards, for instance, FIGS. 4b, 4d and 6, the rhombs, (eg. (R1) and (R2) in FIG. 4d), are oriented as functional mirror images of each other, while the side the input beam enters is, in both instances, labeled (RS1). It is felt this was the best way to disclose the invention, however, it might lead to some confusion regarding angles between, say, sides (RS1) and (RS2). In the foregoing discussion that angle is identified as being greater than 90 degrees. This is valid for the first (RS1) shown rhomb. For purposes of understanding the foregoing discussion, however, in mirror image the sides (RS1) and (RS3) in the second rhomb (RS2) can be considered reversed when the angles therebetween are described as are those in the first rhomb (RS1).

Finally, to avoid confusion, the terminology "beam locus" can be read "beam path", and the terminology "similar elements" should be read to mean that the elements were produced with an intent that they be idential. However, even with that intent in practice elements are not usually identical as regards, for instance, beam angular deviation caused thereby when an electromagnetic beam is passed therethrough.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A method of constructing a multiple element retarder system for introducing a relative phase retardation between orthogonal components of a polarized beam of electromagnetic radiation entered thereinto, said multiple element retarder system comprising at least two similar elements which are sequentially secured with respect to one another such that a beam of electromagnetic radiation entered to the first thereof undergoes internal reflection at least once in each of the at least two elements, and exits the second thereof along a locus which is not angularly deviated or laterally offset from that of said entered beam by more than acceptable amounts;

said method comprising the steps of:

practicing steps a and b in either order, said steps a and b being:

a) providing a multiplicity of similar elements;

b) defining acceptable beam angular deviation and lateral offset values;

said method further comprising:

c) from said multiplicity of similar elements selecting two thereof and securing them in a sequential system, then experimentally monitoring angular deviation entered to a beam of electromagnetic radiation entered to a first thereof, so that it undergoes internal reflection at least once in each of the at least two elements, and then exits the second thereof;

d) determining if the beam angular deviation experimentally monitored in step c is acceptable under the criteria defined in step b, and performing a selection from the group consisting of:

accepting the said sequential system if said defined angular deviation criteria is met and proceeding to step e; and rejecting said sequential system and repeating step c if said defined angular deviation criteria is not met;

e) if practice of step d results in accepting said sequential system, proceeding to determine if a lateral offset exists between the beam entered to the first element and that exiting the second element, and if so performing at least one selection from the group consisting of:

changing the relative orientation of said selected elements with respect to one another; and rotating said system of the two selected elements as said unit about an axis not parallel to the electromagnetic beam;

until said lateral offset entered to said beam of electromagnetic radiation is determined to be acceptable under the criteria defined in step b;

f) optionally experimentally re-checking if the angular deviation entered to said beam of electromagnetic radiation is still acceptable after practice of step e; and accepting said sequential system only if both the angular deviation and lateral offset entered to said beam of electromagnetic radiation are then acceptable under the criteria of step b.

2. A method as in claim 1, in which step c comprises determining a plurality of acceptable sequential combinations of selected elements via a systematic testing of at least some of all possible sequential combinations of selected elements, followed by separate practice of steps d-f for at least two of said sequential combinations.

3. A method as in claim 1, in which step c involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are offset from being parallel to one another by no more than about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

4. A method as in claim 3, in which step c involves selecting two sequential parallelogram shaped rhombs wherein the angles of the parallelogram shaped rhomb are nominally selected from the group consisting of:
36, 144, 36, and 144 degrees; and
45, 135, 45 and 135 degrees.

5. A method as in claim 3, in which step c involves selecting two sequential parallelogram shaped rhombs which are fabricated from fused silica.

6. A method as in claim 3, in which the selected two sequential parallelogram shaped rhombs are characterized by at least one of the second RS2 and forth RS4 sides of at least one of the parallelogram shaped rhombs having a coating thereupon which has a different refractive index than does the material from which said corresponding parallelogram shaped rhomb is comprised.

7. A method as in claim 1, in which providing a multiplicity of parallelogram shaped rhombs as elements and step b involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are parallel to one another within about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof;

said system being characterized in that at least one of the second RS2 and forth RS4 sides of at least one of the parallelogram shaped rhombs has a coating thereupon which has a different refractive index than does the material from which said corresponding parallelogram shaped rhomb is comprised.

8. A method as in claim 7, in which step a involves providing two sequential parallelogram shaped rhombs wherein the angles of the parallelogram shaped rhomb are nominally selected from the group consisting of:
36, 144, 36, and 144 degrees; and
45, 135, 45 and 135 degrees.

9. A method as in claim 7, in which step a involves providing sequential parallelogram shaped rhombs which are fabricated from fused silica and the coating is $MgF_2$.

10. A method as in claim 1, in which step b involves selecting a system of sequential elements which are further characterized by at least one selection made from the group consisting of:
at least one of the sequential elements is mounted to a mechanism for translating and/or tilting the element, for the purpose of aligning the system such that the output beam is substantially angularly undeviated from said input beam;
at least one of the sequential elements has a coating upon a surface thereof at which internal reflection of a beam of electromagnetic radiation occurs, said coating having a different refractive index than does the material from which said corresponding element is comprised;
at least one of the sequential elements has a coating upon a surface thereof through which a beam of electromagnetic radiation enters or exist, said coating having a different refractive index than does the material from which said corresponding element is comprised;
there is present an additional sequential multiple wedge system in said system for introducing a relative phase retardation into orthogonally polarized components of an electromagnetic beam, wherein one said wedge W1 can be rotated with respect to another W2 thereof and/or both wedges W1 W2 can be rotated simultaneously, for the purpose of aligning the system such that the output beam is substantially angularly undeviated from said input beam.

11. An ellipsometer or polarimeter system comprising:
a) a source of electromagnetic radiation;
b) a polarizer;
c) a stage for supporting a sample;
d) an analyzer; and
e) a detector;

said ellipsometer or polarimeter system further comprising at least one rotating or rotatable compensator system present at at least one location selected from the group consisting of:
between said source of electromagnetic radiation and said stage for supporting a sample; and
between said stage for supporting a sample and said detector;
said at least one rotating or rotatable compensator comprising at least two sequential elements oriented with respect to one another such that said entered electromagnetic beam undergoes internal reflection at least once in each of the elements, with the sequence, orientation, geometry, and symmetry of the elements being such that the locus of the output beam is substantially angularly undeviated from that of the input beam by a translation of the system, and the locus of the output beam angle is substantially angularly undeviated from that of the input beam by a rotation of the system.

12. An ellipsometer or polarimeter system as in claim 11, wherein said at least one rotating or rotatable compensator comprises two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another", means that said said third (RS3) side of said first and first (RS1) side of the second of said parallelogram shaped rhombs are offset from being parallel to one another by no more than about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

13. A method of constructing a multiple element retarder system for introducing a relative phase retardation between orthogonal components of a polarized beam of electromagnetic radiation entered thereinto, said multiple element retarder system comprising at least two similar elements which are sequentially secured with respect to one another such that a beam of electromagnetic radiation entered to the first thereof undergoes internal reflection at least once in each of the at least two elements, and exits the second thereof along a locus which is not angularly deviated or laterally offset from that of said entered beam by more than acceptable amounts;

said method comprising, before practice of step d, the steps of:
a) providing a multiplicity of similar elements;
b) experimentally determining and recording data describing measured angular deviation entered to a beam of electromagnetic radiation by interaction with each of said multiplicity of similar elements individually;
c) defining acceptable beam angular deviation and laterally offset values and providing a computer program which is capable of analyzing said data recorded in step b;
said method further comprising the steps of:
d) applying said computer program provided in step c to data recorded in step b the end that pairings of similar elements are identified which in sequence meet the acceptable beam angular deviation values identified in step c;
e) selecting at least one of said pairings of similar elements identified in step d and securing the paired similar elements in a sequential system, then experimentally monitoring angular deviation entered to a beam of electromagnetic radiation entered to a first thereof, so that it undergoes internal reflection at least once in each of the at least two elements, and then exits the second thereof;
f) determining if the beam angular deviation experimentally monitored in step e is acceptable under the criteria defined in step c, and performing a selection from the group consisting of:
accepting the said sequential system if said defined angular deviation criteria is met and proceeding to step g; and
rejecting said sequential system and repeating step e with another selected pairing of similar elements if said defined angular deviation criteria is not met;
g) if practice of step f results in accepting said sequential system, proceeding to determine if a laterally offset exists between the beam entered to the first element and that exiting the second element, and if so performing at least one selection from the group consisting of:
changing the relative orientation of said selected elements with respect to one another; and
rotating said system of the two selected elements as said unit about an axis not parallel to the beam of electromagnetic radiation;
until said lateral offset entered to said beam of electromagnetic radiation is determined to be acceptable under the criteria defined in step c;
h) optionally experimentally re-checking if the angular deviation entered to said beam of electromagnetic radiation is still acceptable after practice of step g; and
accepting said sequential system only if both the angular deviation and lateral offset entered to said beam of electromagnetic radiation are then acceptable under the criteria of step c.

14. A method as in claim 13, in which the elements paired by said computer program in step d are paired as neither of them was experimentally determined to enter significant angular deviation to a beam of electromagnetic radiation in step b.

15. A method as in claim 13, in which the elements paired by said computer program in step d are paired as each of them was experimentally determined to enter angular deviation to a beam of electromagnetic radiation in step b, but in an off-setting manner.

16. A method as in claim 13, wherein said similar elements provide at least two sides, either of which can be oriented to serve as the side into which a beam of electromagnetic radiation is input, and in which the step b practice of experimentally determining and recording data describing measured angular deviation entered to a beam of electromagnetic radiation by each of said multiplicity of similar elements individually is performed for each such orientation, and in which all recorded data is considered in step e.

17. A method as in claim 13 which said method further comprises determining, and placing in order, the relatively best pairings of similar elements by a method selected from the group consisting of:
using results from applying said computer program in step d to data recorded in step b to identify pairings of similar elements which in sequence provide the least beam angular deviation; and
recording experimental data determined in step e and applying said data to identify pairings of similar elements which in sequence provide the least beam angular deviation.

18. A method as in claim 17 which optionally further comprises defining a cut-off criteria point as regards beam angular deviation, and rejecting pairings which do not meet said cut-off criteria.

19. A method as in claim 13, in which step a involves providing parallelogram shaped rhombs and step e involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are offset from being parallel to one another by no more than about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof.

20. A method as in claim 19, in which step c involves selecting two sequential parallelogram shaped rhombs wherein the angles of the parallelogram shaped rhomb are nominally selected from the group consisting of:
36, 144, 36, and 144 degrees; and
45, 135, 45 and 135 degrees.

21. A method as in claim 19, in which step c involves selecting two sequential parallelogram shaped rhombs which are fabricated from fused silica.

22. A method as in claim 19, in which the selected two sequential parallelogram shaped rhombs are characterized by at least one of the second RS2 and forth RS4 sides of at least one of the parallelogram shaped rhombs having a coating thereupon which has a different refractive index than does the material from which said corresponding parallelogram shaped rhomb is comprised.

23. A method as in claim 13, in which step a involves providing a multiplicity of parallelogram shaped rhombs as elements and step e involves selecting two sequential parallelogram shaped rhombs as elements, each said rhomb having first RS1, second RS2, third RS3 and forth RS4 sides, said first RS1 and third RS3 sides being substantially parallel to one another and said second RS2 and forth RS4 sides being substantially parallel to one another, said first RS1 and second RS2 sides of said first parallelogram shaped rhomb, and said second RS2 and third RS3 sides of said second parallelogram shaped rhomb meeting one another at angles greater than ninety degrees therebetween, and said second RS2 and third RS3 sides of said first parallelogram shaped rhomb and said first RS1 and second RS2 sides of said second parallelogram shaped rhomb meeting one another at angles less than ninety degrees therebetween, said two parallelogram shaped rhombs being oriented with their first and third sides being substantially parallel to one another, wherein "substantially parallel to one another" means that said said third (RS3) side of said first and first (RS1) side of the second of said parallelogram shaped rhombs are offset from being parallel to one another by no more than about +/−ten (10) degrees;

such that a beam of electromagnetic radiation caused to enter the first RS1 side of one thereof, at a substantially normal angle thereto, then proceeds so that it internally reflects from said forth RS4 and second RS2 sides thereof, then exits said third RS3 side thereof in a direction such that it then enters the first RS1 side of the second thereof at a substantially normal angle thereto, then proceeds so that it internally reflects from said second RS2 parallelogram shaped rhomb and forth RS4 side thereof, then exits said third RS3 side thereof;

said system being characterized in that at least one of the second RS2 and forth RS4 sides of at least one of the parallelogram shaped rhombs has a coating thereupon which has a different refractive index than does the material from which said corresponding parallelogram shaped rhomb is comprised.

24. A method as in claim 23, in which step a involves providing two sequential parallelogram shaped rhombs wherein the angles of the parallelogram shaped rhomb are nominally selected from the group consisting of:
36, 144, 36, and 144 degrees; and
45, 135, 45 and 135 degrees.

25. A method as in claim 23, in which step a involves providing sequential parallelogram shaped rhombs which are fabricated from fused silica and the coating is $MgF_2$.

26. A method as in claim 13, in which step e involves selecting a system of sequential elements which are further characterized by at least one selection made from the group consisting of:

at least one of the sequential elements is mounted to a mechanism for translating and/or tilting the element, for the purpose of aligning the system such that the exiting beam is substantially angularly undeviated from said input beam;

at least one of the sequential elements has a coating upon a surface thereof at which internal reflection of a beam of electromagnetic radiation occurs, said coating having a different refractive index than does the material from which said corresponding element is comprised;

at least one of the sequential elements has a coating upon a surface thereof through which a beam of electromagnetic radiation enters or exist, said coating having a different refractive index than does the material from which said corresponding element is comprised;

there is present an additional sequential multiple wedge system in said system for introducing a relative phase retardation into orthogonally polarized components of an electromagnetic beam, wherein one said wedge W1 can be rotated with respect to another W2 thereof and/or both wedges W1 W2 can be rotated simultaneously, for the purpose of aligning the system such that the output beam is substantially angularly undeviated from said input beam.

27. A method as in claim 1, which involves performing at least one selection from the group consisting of:
storing at least some data in machine readable media;

analyzing at least some of the data and storing at least some of the results of said analysis in machine readable media;

displaying at least some data by electronic and/or non-electronic means;

analyzing at least some of the data and displaying at least some of the results of said analysis by electronic and/or non-electronic means;

causing at least some data to produce a signal which is applied to provide a concrete and tangible result;

analyzing at least some of the data and causing at least some thereof to produce a signal which is applied to provide a concrete and tangible result.

28. A method as in claim 13, which involves performing at least one selection from the group consisting of:

storing at least some data in machine readable media;

analyzing at least some of the data and storing at least some of the results of said analysis in machine readable media;

displaying at least some data by electronic and/or non-electronic means;

analyzing at least some of the data and displaying at least some of the results of said analysis by electronic and/or non-electronic means;

causing at least some data to produce a signal which is applied to provide a concrete and tangible result;

analyzing at least some of the data and causing at least some thereof to produce a signal which is applied to provide a concrete and tangible result.

* * * * *